(12) United States Patent
Wiening et al.

(10) Patent No.: US 6,362,461 B1
(45) Date of Patent: Mar. 26, 2002

(54) METHOD AND DEVICE FOR INDUCTION SEALING

(75) Inventors: Heinz-Rudolf Wiening, Alfeld; Horst Trombach, Bremen, both of (DE)

(73) Assignee: Alfelder Kunststoffwerke Herm. Meyer GmbH, Alfeld (DE)

(*) Notice: Subject to any disclaimer, the term of this patent is extended or adjusted under 35 U.S.C. 154(b) by 0 days.

(21) Appl. No.: 09/367,793

(22) PCT Filed: Feb. 19, 1998

(86) PCT No.: PCT/EP98/00957

§ 371 Date: Nov. 27, 1999

§ 102(e) Date: Nov. 27, 1999

(87) PCT Pub. No.: WO98/36969

PCT Pub. Date: Aug. 27, 1998

(30) Foreign Application Priority Data

Feb. 19, 1998 (DE) .......................................... 197 07 007

(51) Int. Cl.[7] .............................................. B23K 13/01
(52) U.S. Cl. ...................... 219/604; 219/611; 219/647
(58) Field of Search ................................. 219/633, 634, 219/670, 647, 604, 611, 617; 229/43; 215/DIG. 1, 341, 232; 220/306, 359; 493/103, 105; 159/69, 272

(56) References Cited

U.S. PATENT DOCUMENTS

| 2,474,703 A | * | 6/1949 | Story ........................ 219/604 |
| 2,937,481 A | | 5/1960 | Palmer |
| 3,397,297 A | | 8/1968 | McCorry |
| 3,491,510 A | | 1/1970 | Sternau |
| 3,694,609 A | * | 9/1972 | Kennedy ..................... 219/604 |
| 3,767,076 A | | 10/1973 | Kennedy |
| 3,808,074 A | * | 4/1974 | Smith et al. .................. 156/69 |
| 3,815,314 A | | 6/1974 | Pollock et al. |
| 4,017,704 A | * | 4/1977 | Collins, III et al. ........ 219/660 |
| 4,044,941 A | * | 8/1977 | Knudsen ..................... 220/258 |
| 4,246,461 A | | 1/1981 | Jeppson |
| 4,248,653 A | | 2/1981 | Gerber |
| 4,264,316 A | * | 4/1981 | Knudsen ..................... 493/103 |
| 4,292,489 A | | 9/1981 | Gerber |
| 4,487,313 A | * | 12/1984 | Repik et al. ................. 206/205 |
| 4,771,903 A | * | 9/1988 | Levene et al. ............... 215/232 |
| 6,104,013 A | * | 8/2000 | Miller ........................ 219/633 |

FOREIGN PATENT DOCUMENTS

| DE | 32 24 342 A1 | 1/1984 |
| EP | 0 118 186 | 1/1984 |
| EP | 0 223 517 B1 | 11/1986 |
| EP | 0 362 799 | 10/1989 |
| FR | 2484387 | 12/1981 |
| GB | 712494 | 7/1954 |
| GB | 1319679 | 6/1973 |
| GB | 1476325 | 10/1977 |
| WO | WO 96/35614 | 11/1996 |

* cited by examiner

*Primary Examiner*—Tu Ba Hoang
(74) *Attorney, Agent, or Firm*—Salter & Michaelson

(57) ABSTRACT

A sealing device for sealing non-circular, in particular polygonal, for example tetragonal, hexagonal, octagonal or elliptical, container openings comprises one or a plurality of induction loops (11, 38, 41) for sealing purposes. Containers (2) comprise joined-on closure devices (3) with sealing discs (15) joined onto a sealing edge (14) of the container opening. The induction loops (11, 38, 41) are adapted to the shape of the sealing edge (14) and the spacing between the induction loop (11, 38, 41) and sealing edge (14) is constantly adjustable and selectable.

20 Claims, 3 Drawing Sheets

METHOD AND DEVICE FOR INDUCTION SEALING

TECHNICAL FIELD

The invention relates to a sealing device for sealing non-circular, in particular polygonal, such as tetragonal, hexagonal, octagonal or elliptical, container orifices, wherein one or more induction loops are provided for sealing and the induction loops are adapted to the shape of the edge of the seal, and a process for sealing such container orifices, as well as a sealing washer used therein.

BACKGROUND OF RELATED ART

For economical stacking of receptacles they are preferably produced as non-circular tins, in particular tetragonal tins, for example for cocoa powder. Hereby more rectangular tins can be accommodated on the same floor space than with the provision of round tins. The latter are, however, preferred in production.

It is in fact found that the sealing of angular tins proves to be more difficult than the sealing of round tins. Therefore angular containers are frequently provided with round upper orifices. Tetragonal glass containers, the upper orifice edge of which can be glued down, prove to be particularly advantageous herein.

These glass containers are, however, not suitable for storing light-sensitive products, such as, for example, cocoa or espresso powder. If light were to enter the glass containers they would be decomposed or be subjected to other disadvantageous effects. It is therefore known to use a particular type of opaque plastics material containers especially for such products. Sticking foils on the upper encircling edge of these plastics material containers proves, however, to be problematic. For example, known foils do not stick sufficiently reliably or not at all on a HDPE (high density polyethylene) plastics material.

It is known to seal receptacles of this kind with light-sensitive products or even with milk or protein products by thermal conduction. Heat is here introduced directly into a suitable foil, whereby the plastics material surface of the container melts on to the orifice thereof. The heat can be produced in the foil by electric current or in another manner, for example by heat introduction. Products such as prawn salad, for example, are sealed in this manner with an aluminum foil or plastics material foil with a proportion of metal. Sealing by conduction, however, in most cases proves complicated and susceptible to faults. Moreover, it is unsuitable for the vagrious applications, for example with receptacles with light-sensitive products, such as cocoa and espresso powder or with HDPE containers with milk or protein products, as sealing through layers which insulate and seal the aluminum foil upwardly to the lid of the container is almost impossible.

It is further known to seal receptacles with a round filling orifice by induction sealing. A device is known from EP 0 223 517 B1 by means of which containers made of a plastics material with a lid cover also made of plastics material, as well as a metallic layer, are sealed by induction. The induction loop used in the device has a shaping corresponding to the edge to be sealed. It contains at least one corner shaping. A ferrite current concentrator unit is arranged herein. The induction loop engages with one surface into the cover for sealing. The ferrite current concentrator is arranged next to the induction loop.

SUMMARY

The object of the invention is to provide a process and a device for induction sealing of non-circular, in particular polygonal, such as tetragonal, hexagonal, octagonal or elliptical, container orifices, which at little expense enables many sealing processes per unit of time, perfect sealing being guaranteed, particularly also in the corners.

This object is achieved for a sealing device for sealing non-circular, in particular polygonal, such as tetragonal, hexagonal, octagonal or elliptical, container orifices, wherein one or more induction loops are provided for sealing and the induction loops are adapted to the shape of the edge of the seal, in that the induction loops are dimensioned in such a way that a homogeneous field adapted to the measurements of the edge of the seal results in sealing, means are provided for controlling the induction loops with respect to the movement of the containers, parallel in time or speed, or means are provided for creating a balance of the production rate of the containers during sealing with respect to the induction loops and means are provided for timing the belts conveying the containers and the pressing and sealing process and for a possible adjustment of pressure during the sealing process.

The object is achieved for a process for sealing non-circular, in particular polygonal, such as tetragonal, hexagonal, octagonal or elliptical, container orifices in that, to ensure that the distance between the edge of the seal and the induction loop remains the same during the induction process, either the containers are halted to create a dwell time or induction loop and edge of seal are moved synchronously or at the same speed, the induction loops or plungers with induction loops are lowered from above on to lids of the containers with sealing washers to fit exactly, an induction sealing is carried out by applying a pre-determined pressure or without pressure, the induction loops or the piston(s) are conveyed upward after the induction sealing and the containers are guided onward out of the sealing device.

The object is achieved for a sealing washer used for the sealing, which is non-circular, in particular polygonal or elliptical, and has at least one metal foil and a layer made of a sealing material adapted to the material of the container on its underside pointing toward the container, in that a laminated upper part of the sealing washer arranged in the container lid is provided, and the metal foil, pointing toward the lid, is covered by a layer of paper or of thin foam foil or by a layer of wax, bonding emulsion or polyethylene and is connected to the upper part of the sealing washer.

The distance between the induction loop and the edge of the seal is preferably adjustable or discretionary, depending on shape, size and material of the edge of the seal and/or the sealing washer. For sealing by induction the induction loops are preferably bent in the same shape and dimension as corresponding to the upper surrounding edge of the seal of the container, either without pressure or under pressure. In the latter case the sealing washer is pressed against the edge of the seal either by the lid of the container or by a plunger.

Thus a device and a process for sealing non-circular container orifices are created, in which the induction takes place evenly. Combustion of the longitudinal faces of angular or elliptical container orifices or leaving corners open is thus avoided. By means of the possible pressure-less sealing or sealing which can be provided using available pressure when screwing on or attaching the lid to the neck of the container, additional expense for a pressure device, which is otherwise useful and customary for ensuring perfect sealing, is advantageously saved. Even lengthening of the time for the sealing process does not occur, as either induction loop and container lid are moved in parallel synchronously or at the same speed or the time loss occurring because of the halting of the containers for sealing is counterbalanced by parallel motion of several containers during the sealing process. In the actual process of filling the containers parallel motion of this kind is already customary in the food industry.

By providing dual coils or simply coils running dually on the induction loops, non-homogeneities no longer occur in the region of the inlets and outlets for the current from a loop. An exactly matched homogeneous field results. Sealing of the non-circular containers is thus guaranteed in an optimal manner, in particular also at the corners.

The induction loops are preferably provided in the plunger(s). They can, however, also be provided next to the plungers or exclusively, in other words without additional plungers. Preferably a large plunger is provided in the sealing device with induction loops provided next to one another, corresponding to the distances of containers preferably in parallel motion during the induction process. For this embodiment, however, several plungers arranged next to one another or behind one another can also be arranged with correspondingly dimensioned induction loops. The induction loops are preferably arranged behind one another when they are moved on a conveyor belt together with the containers synchronously and/or at the same speed as the containers.

The edges of the seals of the containers are preferably already provided respectively with a correspondingly dimensioned sealing washer and a lid. It is possible, however, for them not to be provided with lid and sealing washer until they are in or in the region of the sealing device.

For sealing with a plunger the plungers are lowered with the induction loops at a certain pressure on to the containers. The plunger preferably presses a metal foil provided in the sealing washer through the lid as a so-called antenna or means for producing the induction sealing in connection with a sealing layer on to the upper surrounding edge of the container. If current is charged into the induction loops the metal foil sticks to the upper surrounding edge of the seal of the container. The connection of metal foil and surrounding edge of seal is the same at every point of the upper surrounding edge of the container. Optimum sealing with the foil takes place even at the corners of the container orifice, as the field created by the induction loop is adapted exactly to the measurements of the upper surrounding edge of the seal of the container and is homogeneous.

To create complete homogeneity of the field a dual coil of the induction loop is preferably provided.

The distance between the induction loop and the edge of the seal can preferably also be selected depending on shape, size and material of the edge of the seal and/or the sealing washer.

Adaptation to different measurements and shapings of container orifices occurs by providing an assortment of various induction loops, in particular integrated into plungers, with corresponding measurements and shapes. If the container edge shapes and measurements are altered the induction loops or induction loops with plunger are completely changed. After the sealing process the induction loop or the plunger(s) is/are conveyed upward away from the containers. A driving device transports the containers out of the sealing device, in particular after previously being in parallel motion to create a dwell time and to balance the production rate, back into a row.

It is particularly preferable that means are provided for the induction loops for setting a pre-determinable current to create an adapted, homogeneous field, and for the plungers means for setting a pre-determinable pressure effective during the induction process. Preferably control devices are provided for timing the conveyor belts, the pressing and sealing process and for possible pressure adjustment during the sealing process. Preferably a thermoplastic material, in particular polymers, such as polypropylene, polyester, PVC or such, can be provided as the material for the container, or particularly preferred HDPE (high density polyethylene) or even glass.

The sealing washers have, additionally to the metal foil, in particular aluminum foil, and the sealing layer, which is arranged pointing toward the product in the container, a layer of paper, thin foam foil or of wax, bonding emulsion or polyethylene facing the lid of the container, in other words under the upper part of the sealing washer inserted therein. The latter is preferably made of polyethylene or polypropylene foam, laminated, or of laminated cardboard.

BRIEF DESCRIPTION OF THE DRAWINGS

To explain the invention in more detail, embodiments of a device for sealing non-circular container orifices for light-sensitive products will hereinafter be described with reference to the drawings, in which.

DETAILED DESCRIPTION OF THE ILLUSTRATIVE EMBODIMENT

Figure 1:
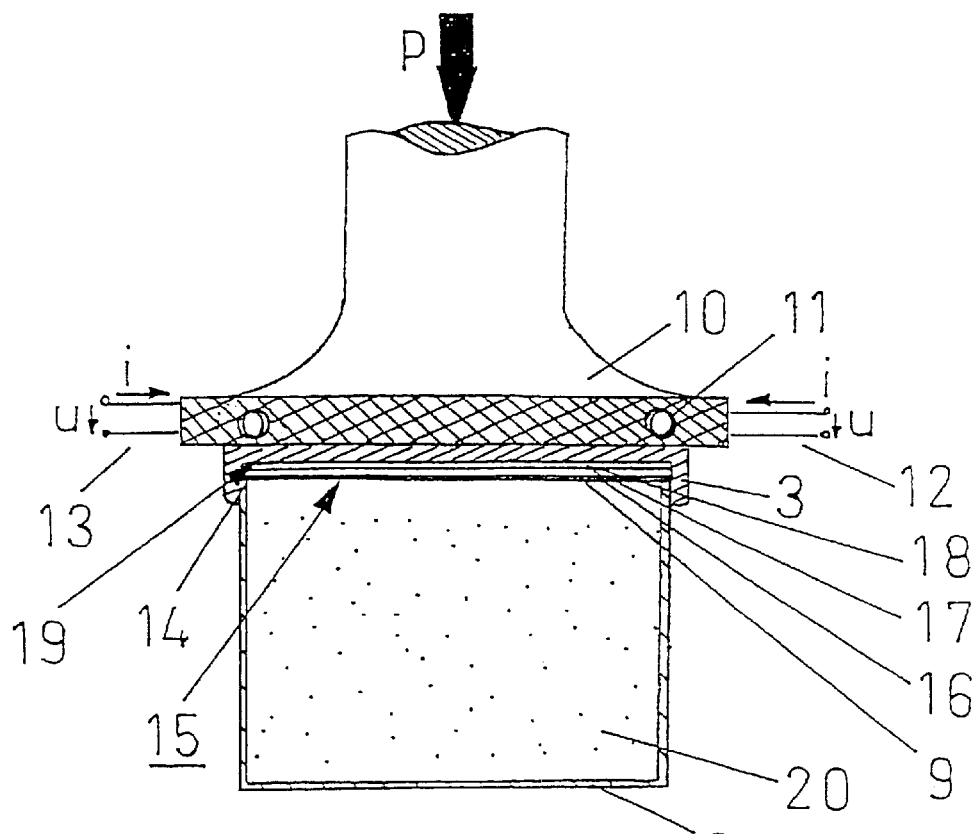
FIG. 1 is a sectional view of a container with sealing washer, lid and induction loop according to the invention with a plunger.

In FIG. 1 a sectional view through a first embodiment of an induction loop 11 according to the invention in a plunger 10 is shown. The plunger 10 is provided to hold an induction loop 11. The induction loop 11 is formed as a dual coil. In this way the disadvantage which arises with induction loops with only one coil in the region of the inlet and outlet for the current, in other words a slight non-homogeneity, is avoided. The inlets and outlets for the current are indicated for the dual coils of the induction loop 11 by the reference numerals 12 and 13.

On the upper edge of the container, at the sealing edge 14 of the container 2, a sealing washer 15 is arranged. The sealing washer 15 has three layers. Adjoining the upper edge of the container 2 a sealing layer 9 is provided, and over this a metal foil 16, for example an aluminum foil. The sealing layer 9 preferably covers the whole metal foil 16. During the sealing process it melts in the region of the sealing edge 14, and therefore consists of a sealing material matched to the material of the container. Above the metal foil 16 a layer 18 made of a sealing material is provided as the upper part of the sealing washer 15. This layer 18 fits closely in the lid 3. It preferably consists of polyethylene or propylene foam and is preferably laminated, at least on the side pointing toward the metal foil. Alternatively the layer 18 can also, however, consist of laminated cardboard.

This layer 18 is directly inserted into the lid and rests on its inner surface 19. Between the metal foil 16 and the layer 18 a layer 17 is arranged. It preferably consists of a thin layer of paper and thin foam foil. It can alternatively also consist of wax, bonding emulsion or polyethylene. The layer 17 serves as a connection to the layer 18.

The container 2 is filled with a product 20. This can, for example, be cocoa or espresso powder, a milk or protein product, or some other product. The sealing layer 9 should be made of a material which does not impair the quality of the product in the container 2. In order to protect the product even after the container has first been opened, in other words when the metal foil 16 has been separated from the upper sealing edge 14 of the container, the layers 17 and 18 are provided in the lid 3 of the container 2. These layers are also preferably made of a material which does not react with the product in the container or have other negative effects on the product.

It is integrated in the plunger 10 in such a way that, in the state where current is flowing through, by the action of induction it connects the foil 16 to the upper edge of the container 14 by melting it on. In order to ensure that the foil 16 adjoins the upper surrounding edge of the container 14 without folds and securely, the plunger 10 is impinged with a pre-determinable pressure p. This pressure can be set on setting means, not shown, in a pre-determinable size range. The respective pressure time is also determined at the same time. The plunger 10 is then conveyed upward away from the lid 3 of the container 2 by switching off the power supply of the induction loop.

The induction loop 11 is integrated in the plunger 10 in such a way that, in the state where current is flowing through, by the action of induction it connects the foil 16 to the upper edge of the container 2 by melting it on. In order to ensure that the foil 16 adjoins the upper surrounding edge of the container 2 without folds and securely, the plunger 10 is impinged with a pre-determinable pressure p. This pressure can be set on setting means, not shown, in a pre-determinable size range. The respective pressure time is also determined at the same time. The plunger 10 is then conveyed upward away from the lid 3 of the container 2 by switching off the power supply of the induction loop.

Figure 2:
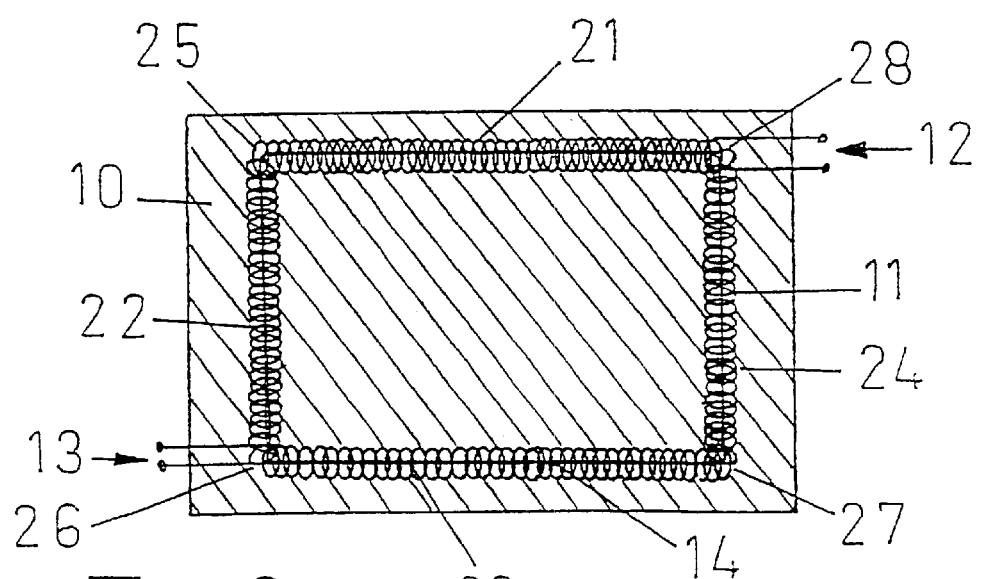
FIG. 2 is a plan view of the partially cut open plunger with induction loop according to FIG. 1.

FIG. 2 shows a plan view of a plunger 10 according to FIG. 1. The plunger 10 is illustrated as cut open to reveal the positioning of the induction loop 11. The induction loop 11 is located as a dual coil aligned above the upper sealing edge 14 of the container 2, indicated as a line. With circular orifices of containers, plate-shaped induction fields are normally used in induction sealing. These plate-shaped induction fields are produced in a plate by a coil bent in the shape of a wavy line. Since with circular orifices in each case the paths to the respective outer edge of the container orifice are the same, even sealing occurs in the whole region of the upper surrounding edge of the container.

If with a non-circular—in other words here tetragonal— orifice of the container a coil bent into the shape of a wavy-line were provided in a plate, this would result in combustion in the region of the longitudinal sides 21, 22, 23, 24 of the container orifice. In the region of the corners 25, 26, 27, 28 of the container orifice, on the other hand, it would lead to incomplete sealing. By providing the induction loop 11 corresponding to the measurements of the sealing edge 14 the corners 25, 26, 27 and 28 are just as well and securely sealed as the longitudinal sides 21, 22, 23 and 24.

By providing an assortment of plungers 10 of various sizes with induction loops 11 of different measurements, corresponding to the respective measurements of the edges of the containers 14 to be sealed with correspondingly dimensioned sealing washers 15, quick adaptation is possible during operation by changing the corresponding plunger 10. In the same way plungers with respectively several induction loops arranged next to one another can be provided in different dimensions. For quick changing, a latching mechanism, for example, can be provided in the sealing device to latch in the corresponding plunger(s).

Figure 3:
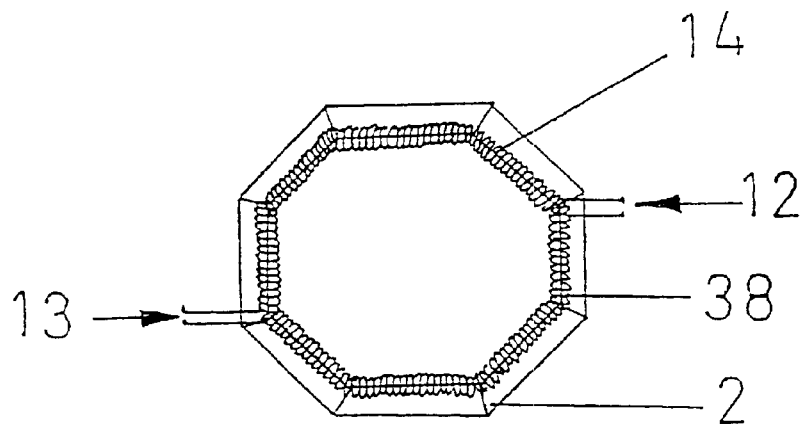
FIG. 3 is a plan view of a second embodiment of an induction loop according to the invention with container.

FIG. 3 shows a plan view of a second embodiment of an induction loop according to the invention with container arranged underneath. The container 2 has an octagonal shape, as has its sealing edge 14. This is indicated in FIG. 3 by a line.

The induction loop 38 is arranged above the sealing edge 14 on the lid of the container 2. In contrast to the embodiment according to FIG. 1 or 2, in the embodiment according to FIG. 3 no plunger is provided. The induction loop 38 is provided without a plunger. It is arranged above the container closed with a lid and seals the sealing edge 14 with a sealing washer, without itself exerting any pressure on the lid. The required pressure is already provided by the lid screwed on to the container orifice. A further production of pressure is therefore no longer necessary for the sealing process. Alternatively the induction process can take place completely without pressure. The sealing washer is herein not pressed on to the edge of the seal by the lid.

Nevertheless, its sealing layer melts into the edge of the seal of the container during the sealing process. The induction loop is arranged for this purpose at a suitable distance from the edge of the seal, and the homogeneous field produced by it is suitably adapted to shape, size and the material to be melted.

Figure 4:
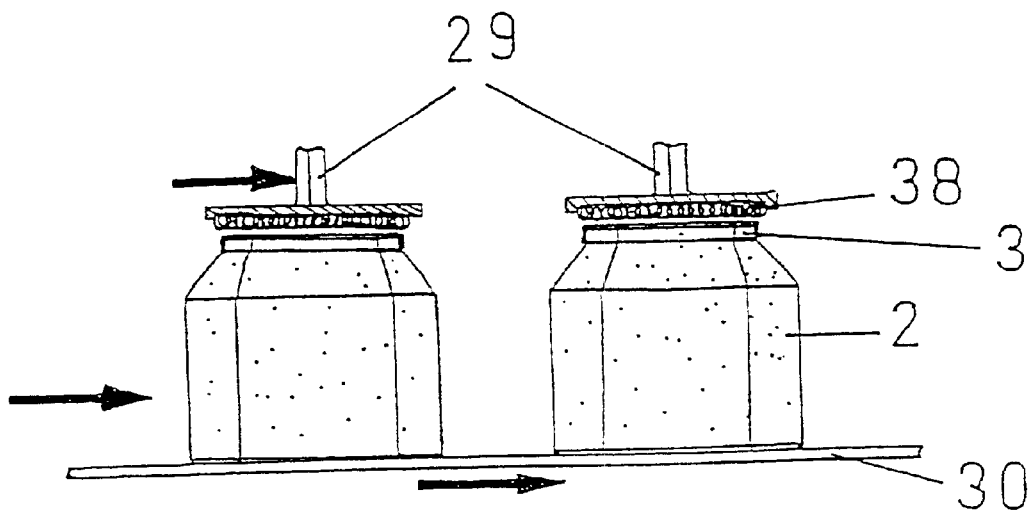
FIG. 4 is a lateral view of the sealing process according to the invention with parallel movement of container and induction loop.

In FIG. 4 a corresponding sealing process is illustrated with container and induction loop according to FIG. 3. In FIG. 4 two containers with induction loops 38 arranged above them in each case are illustrated in a holding device 29. The containers 2 are placed on a conveyor belt 30 and are moved by this. The movement direction is illustrated by arrows. During the movement of the containers on the conveyor belt 30 they reach the sealing device according to the invention. Herein the holding devices 29 travel with the induction loops 38 from above down on to the lids 3 of the containers 2. They then follow the movement of the containers in parallel during the sealing process. This is also indicated by an arrow in FIG. 4.

During the sealing process care should be taken that the distance between the induction loop and the edge of the seal does not change. The distance should remain constant during the whole sealing process.

If a plunger with induction loop, as illustrated in FIG. 1 or 2, is to be used for the sealing process, in the sealing device according to the invention after the containers have entered this sealing device the plunger travels with the induction loop down on to the container with lid 3. The pressure on the lid is applied simultaneously with the movement parallel to the movement of the containers. The sealing process then occurs as described above.

Before leaving the sealing device either the induction loop 38 in the holding device 29 or else a plunger 10 with induction loop 11 is conveyed up again from the lid 3 of the containers 2, so the fully sealed containers can be further treated in the further production process.

Figure 5:
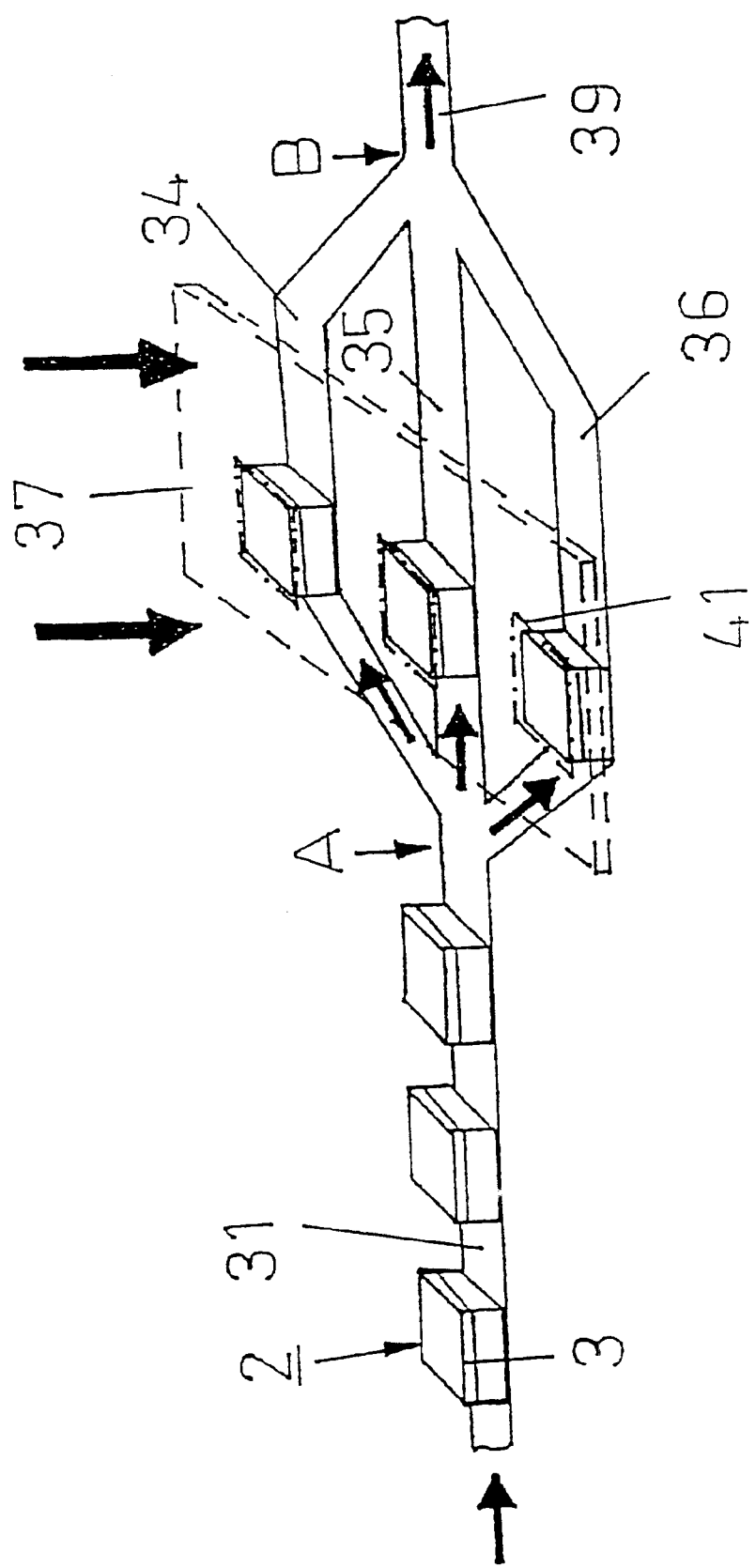
FIG. 5 is a perspective schematic diagram of a sealing device according to the invention with branching of the feed belt to create a dwell time.

FIG. 5 shows a perspective schematic diagram of an induction sealing device according to the invention with a branched feed belt 31. Three containers 2 are arranged behind one another in a row on a feed belt 31. The containers are already provided with a lid 3 in each case. On the upper surrounding edge of the respective container, in other words underneath the lid, non-visible sealing washers are provided in each case.

The feed belt 31 branches out at the branching point A into three belts 34, 35, 36. On these three belts 34, 35, 36 three containers 2 with attached lids 3 are arranged in parallel. Above the three containers a plunger 37 is provided. This is indicated by broken lines in FIG. 5.

Above each receptacle respective induction loops 41 are provided in the plunger 37. The induction loops 41 have measurements corresponding to the measurements of the containers 2 and of their lids 3. The induction loops 41 are also indicated in FIG. 5 only by dot-dash lines. During the sealing process the plunger 37 is lowered downward on to the lids 3. It then presses on the lids at a pre-determinable pressure. Simultaneously the induction loops are impinged with current. Thereby optimal induction sealing of the containers 2 takes place.

After a predetermined time the plunger 37 is conveyed upward again away from the container lids 3. The induction loops are no longer impinged with current.

A control device sets the containers, which had been halted during the sealing process, into motion again on the belts 34, 35, 36. Corresponding to the speed control of the individual belts the containers 2 are brought back in a row again on to a conveyor belt 39 via the branching point B. The respective conveyance direction of the belts 31, 34, 35, 36, 39 is indicated by arrows. The containers 2 come from a filling device and a device which provides them with the sealing washers and lids on the feed belt 31. After leaving the sealing device the fully sealed containers are taken on the conveyor belt 39, for example, to a packing department.

What is claimed is:

1. A sealing device for sealing at least one container having a non-circular orifice with at least one sealing washer adapted to be joined to the orifice and induction sealed thereon, the sealing device comprising:
    a plurality of conveyor belts constructed and arranged to move the at least one container;
    at least one induction loop constructed and arranged to induce a current into the at least one sealing washer, the at least one induction loop comprising a coil member selected from the group consisting of a dual coil and a pair of coils running dually, and producing a homogeneous field adapted to a shape and measurement of an upper, sealing edge of the orifice of the at least one container, and moving parallel to the movement of the conveyor belts during sealing of the washer; and
    wherein movement of the at least one induction loop and conveyance of the at least one container on the conveyor belts are selectively controlled so as to substantially eliminate relative movement between the at least one induction loop and the orifice of the at least one container during sealing.

2. A sealing device for sealing at least one container having a non-circular orifice, the device including a plurality of conveyor belts on which the at least one container moves, and having at least one sealing washer which is constructed and arranged to be joined on to the orifice and induction-sealed thereon, the sealing device comprising:
    at least one induction loop adapted to induce a current into the sealing washers, the at least one induction loop comprising a coil member selected from the group consisting of a dual coil and a pair of coils running dually, and producing a homogeneous field adapted to a shape and measurement of an upper, sealing edge of the orifice, the at least one induction loop further being adapted to move during sealing of the washer; and
    wherein the speed of movement of the conveyor belts and movement of the at least one induction loop are selectively controllable so as to substantially eliminate relative movement between the orifice of the at least one container and the at least one induction loop during sealing.

3. The sealing device according to claim 2, further comprising a feed belt branched into several belts with subsequent return to a conveyor belt so as to create a dwell time.

4. The sealing device of claim 2, wherein a distance between the at least one induction loop and the sealing edge is adjustable and discretionary, depending on shape, size and material of the sealing edge and the at least one sealing washer; and
    wherein during sealing the at least one sealing washer is pressed against the sealing edge by a lid of the container.

5. The sealing device according to claim 2, wherein the distance between the at least one induction loop and the sealing edge is adjustable and discretionary, depending on shape, size and material of the sealing edge, and wherein during sealing the at least one sealing washer is pressed against the sealing edge by a plunger.

6. The sealing device of claim 2, wherein means are provided for timing adjustment of pressure during sealing.

7. The sealing device of claim 2, wherein the at least one sealing washer is non-circular and includes:
    a metal foil layer;
    a sealing layer adapted to material of the at least one container;
    a layer of sealing material adapted to fit within a lid of the container and forming an upper part of the sealing washers; and
    a connecting layer selected from the group consisting of paper, foam foil, wax, bonding emulsion, and polyethylene, wherein the connecting layer is constructed and arranged to form a connection to the layer of sealing material and the metal foil layer.

8. The sealing device according to claim 7, wherein the layer of sealing material of the at least one sealing washer is selected from the group consisting of polyethylene and polypropylene foam.

9. The sealing device according to claim 7, wherein the layer of sealing material of the at least one sealing washer is selected from the group consisting of laminated cardboard and laminated polypropylene foam.

10. The sealing device according to claim 2, wherein the distance between the induction loop and the sealing edge is adjustable and discretionary, depending on shape, size and material of the sealing edge, and wherein sealing of the at least one sealing washer takes place without pressure.

11. A process for induction sealing containers each having a non-circular orifice, the process comprising the steps of:
    introducing the containers into a sealing device;
    halting the containers so as to create a dwell time;
    aligning an induction loop above an upper, sealing edge of a corresponding container;
    moving the induction loop from above the corresponding container and on to a lid of the container, the lid having a sealing washer therein;
    moving the induction loop parallel to the lid of the containers;
    applying a current so as to induction seal the containers;

moving the induction loop in an upward direction, out of contact with the container after the induction sealing; and guiding the containers out of the sealing device.

12. The process according to claim 11, wherein the containers are led in groups parallel in time to create the dwell time, and wherein after leaving the sealing device, the containers are guided back in a row on to a conveyor belt via a branching point.

13. The process according to claim 11, wherein the induction loop is moved by a plunger.

14. The process according to claim 13, further comprising the step of impinging the plunger with a predeterminable pressure in order to ensure optimal sealing of the sealing edge.

15. A process for induction sealing containers having a non-circular orifice, the process comprising the steps of:

introducing the containers into a sealing device;

aligning an induction loop above an upper, sealing edge of a corresponding container;

transporting the induction loop and the sealing edge of the corresponding container synchronously so as to substantially eliminate relative movement between the induction loop and the sealing edge of the corresponding container;

moving the induction loop from above the corresponding container on to a lid of the container, the lid including a sealing washer therein;

applying a current so as to induction seal the container;

moving the induction loop in an upward direction, out of contact with the container after the induction sealing; and guiding the containers out of the sealing device.

16. A processing to claim 15, wherein the induction loop is moved by a plunger.

17. The process according to claim 16, further comprising the step of impinging the plunger with a predeterminable pressure in order to ensure optimal sealing of the sealing edge.

18. A process for induction sealing containers having a non-circular orifice, the process comprising the steps of:

introducing the containers into a sealing device;

aligning an induction loop above an upper, sealing edge of a corresponding container;

transporting the induction loop and the sealing edge of the corresponding container synchronously so as to substantially eliminate relative movement between the induction loop and the sealing edge of the corresponding container;

moving the induction loop from above the corresponding container on to a lid of the container, the lid including a sealing washer therein;

moving the induction loop substantially parallel to the lid of the containers;

applying a current so as to induction seal the container;

moving the induction loop in an upward direction, out of contact with the container after the induction sealing; and guiding the containers out of the sealing device.

19. A process according to claim 18, wherein the induction loop is moved by a plunger.

20. The process according to claim 18, further comprising the step of impinging the plunger with a predeterminable pressure in order to ensure optimal sealing of the sealing edge.

* * * * *